(12) United States Patent
Ishihara et al.

(10) Patent No.: US 8,098,176 B2
(45) Date of Patent: Jan. 17, 2012

(54) SYSTEMS AND METHODS FOR ADJUSTING LANDING GEAR ALERT ENVELOPE FOR OFFSHORE PLATFORMS AND BUILDING-TOP LANDINGS

(75) Inventors: Yasuo Ishihara, Kirkland, WA (US); Steve Johnson, North Bend, WA (US); Gary Ostrom, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 37 days.

(21) Appl. No.: 12/821,536

(22) Filed: Jun. 23, 2010

(65) Prior Publication Data

US 2011/0273315 A1    Nov. 10, 2011

Related U.S. Application Data

(60) Provisional application No. 61/332,527, filed on May 7, 2010.

(51) Int. Cl.
*G08B 23/00* (2006.01)

(52) U.S. Cl. ........ 340/970; 340/945; 340/946; 340/963; 340/967; 340/971; 340/973; 340/976; 701/8; 701/9; 701/16; 342/65; 342/455

(58) Field of Classification Search ............... 340/945, 340/946, 963, 967, 970, 971, 973, 976; 701/8, 701/9, 16; 342/65, 455
See application file for complete search history.

(56) References Cited

U.S. PATENT DOCUMENTS

| | | | | |
|---|---|---|---|---|
| 5,666,110 A | * | 9/1997 | Paterson | 340/970 |
| 6,940,427 B2 | * | 9/2005 | Bateman | 340/967 |
| 7,702,461 B2 | * | 4/2010 | Conner et al. | 701/301 |

* cited by examiner

*Primary Examiner* — Tai T Nguyen
(74) *Attorney, Agent, or Firm* — Lowe Graham Jones PLLC

(57) ABSTRACT

Systems and methods for improving landing gear alerting on a rotary wing aircraft. An example system includes a user interface device that allows a user to set a bug altitude value and a radio altimeter that produces an altitude value, both of which are in communication with a processor. The processor receives a bug altitude setting, generates a landing gear alert altitude value based on the received bug altitude setting and a predefined additive, receives a radio altitude value for the rotary-wing aircraft, and generates a landing gear alert if the radio altitude value is less than the landing gear alert altitude value and the landing gear is not in a landing position. An output device in signal communication with the processor, outputs the generated landing gear alert.

17 Claims, 3 Drawing Sheets

SYSTEMS AND METHODS FOR ADJUSTING LANDING GEAR ALERT ENVELOPE FOR OFFSHORE PLATFORMS AND BUILDING-TOP LANDINGS

PRIORITY CLAIM

This application claims priority to Provisional Application Ser. No. 61/332,527 filed on May 7, 2010 and is incorporated herein by reference.

BACKGROUND OF THE INVENTION

There have been several incidents where a helicopter pilot forgot to lower the landing gear during a rooftop landing or offshore platform landing. Because a helideck is raised (often a few hundred feet above the ground or ocean), the existing landing gear alert function doesn't provide a timely alert. In the current ground proximity warning system (GPWS), the landing gear alert envelope is determined only by the radio altitude. The aircraft's radio altitude continues to read a large value (300 feet, for example) until the helicopter gets over the helideck. At that point, the radio altitude jumps to 20 feet, for example. Often, the helicopter is sinking toward the helideck at that point, and there may not be sufficient time for the pilot to react.

SUMMARY OF THE INVENTION

Often, helicopter pilots set a radio altimeter "bug" to an altitude that represents "minimum" safe altitude or decision altitude. Therefore, if the pilot is landing on a platform helideck that is 400 feet above the ocean, the pilot will be setting the "bug" to slightly above 400 feet, for example. This invention provides a landing gear alert at a to-be-determined (TBD) altitude (e.g., 100 feet) above where the "bug" is set to. Therefore, the Ground Proximity Warning System (GPWS) provides a landing gear alert before the radio altimeter sees the helideck.

With this invention, the pilot can still fly around at 300 feet with the landing gear up without getting a landing gear alert if the pilot sets the "bug" at lower altitude during non-landing operations.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
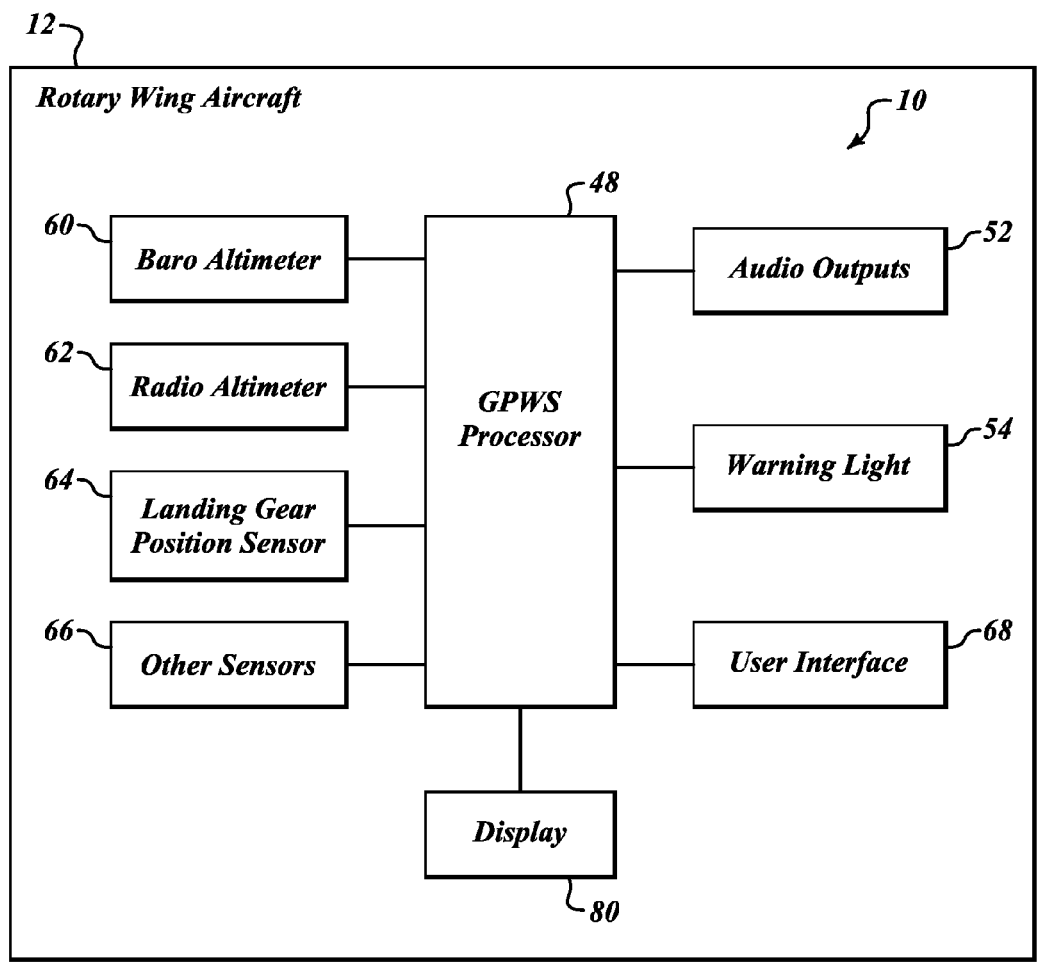
FIG. 1 is a block diagram of an exemplary system formed in accordance with an embodiment of the present invention.

As shown in FIG. 1, a rotary-wing aircraft 12 includes a warning system 10 for providing a "landing gear not down" warning below an improved threshold altitude. The system 10 includes a Ground Proximity Warning System (GPWS) processor 48, audio outputs 52, warning lights 54, a barometric altimeter 60, a radio altimeter 62, a landing gear position sensor 64, one or more various other sensors 66, a user interface 68, and a display device 80.

A pilot of the rotary-wing aircraft 12 uses the user interface 68 to set a bug altitude setting. The bug altitude setting is recorded or retrieved by the GPWS processor 48 for use in calculating an improved landing gear alert altitude. After the improved landing gear alert altitude is determined, the GPWS processor 48 generates a landing gear alert if a signal from the landing gear position sensor 64 indicates that the landing gear is not down and locked and an altitude value received from at least one of the radio altimeter 62 or the barometric altimeter 60 is below this improved landing gear alert altitude.

Figure 2:
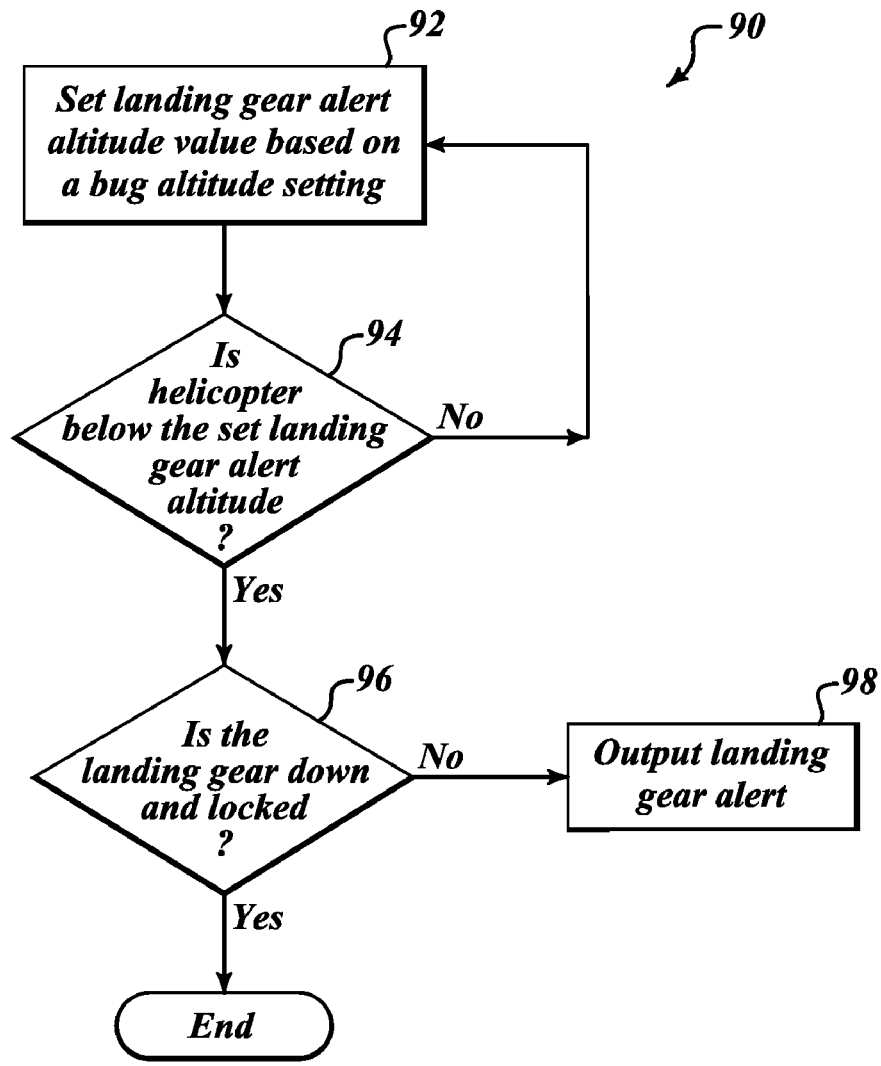
FIG. 2 is a flowchart of an exemplary process performed by the system shown in FIG. 1.

FIG. 2 illustrates an exemplary process performed by the GPWS processor 48 shown in FIG. 1. First, at a block 90, the landing gear alert altitude value is set based on a bug altitude setting. Next, at a decision block 94, the processor 48 determines if the rotary-wing aircraft 12 is below the set landing gear alert altitude. If not, the process returns to block 92. If the rotary-wing aircraft 12 is below the set landing gear alert altitude, then at a decision block 96, the GPWS processor 48 determines if the landing gear is down and locked, based on a signal from the landing gear position sensor 64. If the landing gear is determined to be down and locked, then no alert condition exists and thus no alert regarding landing gear is outputted. If it is determined at the decision block 96 that the landing gear is not down and locked, then at a block 98, the GPWS processor 48 generates an alert signal regarding landing gear and outputs it to one or more of the output devices (the audio outputs 52, the warning light 54, and/or the display 80).

Figure 3:
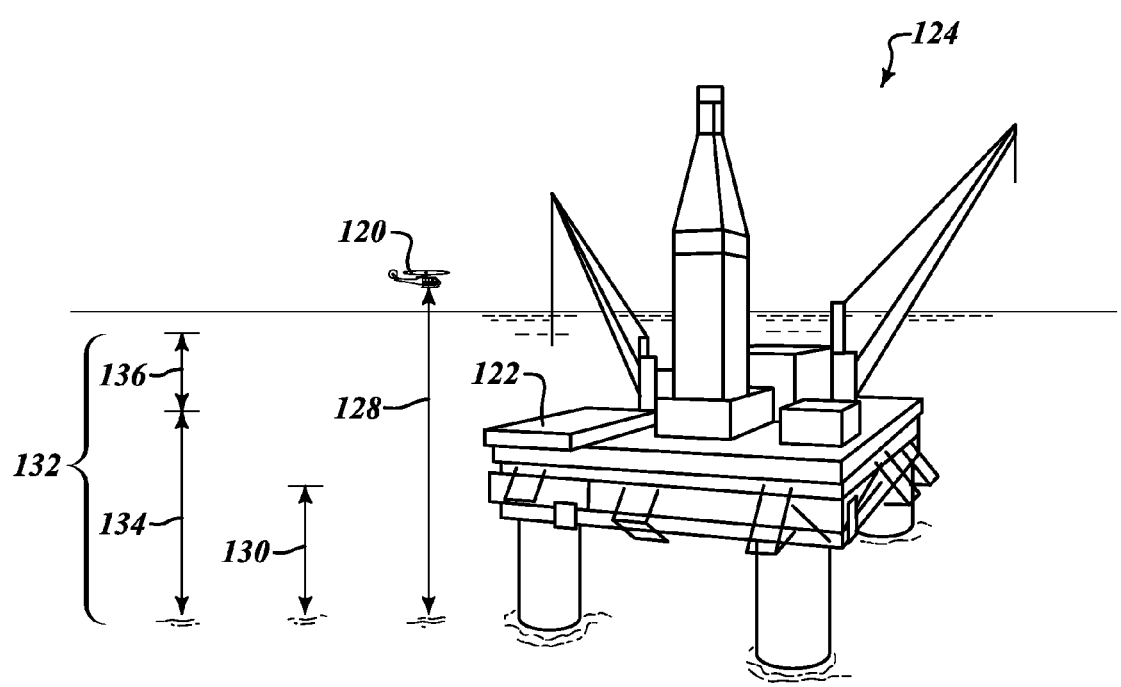
FIG. 3 is a perspective view of a helicopter on approach to landing at a helipad on an oil rig.

FIG. 3 illustrates an oil rig platform 124 that includes a helipad 122 that is located some distance above sea level. A helicopter 120 is approaching the helipad 122 (or other platform located on a raised structure) with an altitude over water 128 (or radio altitude). The previous landing gear alert system has landing gear alert altitude equal to 100 feet. In this prior system, a landing gear alert will not be generated before the helicopter 120 is directly over the helipad 122 even if the helicopter 120 has an altitude over water 128 that is only 50 feet above the helipad 122.

In this invention a landing gear alert altitude 132 is equal to a bug altitude setting 134 (e.g., 200 feet) plus a predefined default setting 136 (e.g., 100 feet). In this example, the new landing gear alert altitude is 300 feet. Thus, ample warning is given to the pilots of the helicopter 120 if they penetrate a radio altitude of 300 feet and their gear is not in the down and locked position.

If the bug altitude setting is set to a lower value during non-landing operations, the combination of the bug setting and the predefined default setting will be lower (130), thereby reducing the number of nuisance alerts.

While the preferred embodiment of the invention has been illustrated and described, as noted above, many changes can be made without departing from the spirit and scope of the invention. For example, this invention may be used with vertical takeoff and landing (VTOL) or fixed wing aircraft. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method performed on an aircraft, the method comprising:
   at a processor on the aircraft,
      receiving a bug altitude setting;
      generating a landing gear alert altitude value based on the received bug altitude setting and a predefined additive;

receiving an altitude value for the aircraft; and
generating a landing gear alert if the altitude value is less than the landing gear alert altitude value and the landing gear is not in a landing position; and
at an output device,
outputting the generated landing gear alert.

2. The method of claim 1, wherein outputting comprises outputting at least one of an audible or visual message.

3. The method of claim 1, wherein the aircraft is a rotary wing aircraft.

4. The method of claim 1, wherein the bug altitude setting is a radio bug altitude setting and the received altitude value is a radio altitude setting.

5. The method of claim 1, wherein the bug altitude setting is a barometric bug altitude setting and the received altitude value is a barometric altitude setting.

6. A system located on an aircraft, the system comprising:
a user interface device configured to allow a user to set a bug altitude value;
a radio altimeter configured to produce an altitude value;
a processor in signal communication with the user interface device and the radio altimeter, the processor comprising:
a component configured to receive a bug altitude setting;
a component configured to generate a landing gear alert altitude value based on the received bug altitude setting and a predefined additive;
a component configured to receive an altitude value for the aircraft; and
a component configured to generate a landing gear alert if the altitude value is less than the landing gear alert altitude value and the landing gear is not in a landing position; and
an output device in signal communication with the processor, the output device configured to output the generated landing gear alert.

7. The system of claim 6, wherein the output device is an audio device.

8. The system of claim 6, wherein the output device is a video device.

9. The system of claim 6, wherein the aircraft is a rotary wing aircraft.

10. The system of claim 6, wherein the bug altitude setting is a radio bug altitude setting and the received altitude value is a radio altitude setting.

11. The system of claim 6, wherein the bug altitude setting is a barometric bug altitude setting and the received altitude value is a barometric altitude setting.

12. A system located on an aircraft, the system comprising:
a means for receiving a bug altitude setting;
a means for generating a landing gear alert altitude value based on the received bug altitude setting and a predefined additive;
a means for receiving an altitude value for the aircraft; and
a means for generating a landing gear alert if the altitude value is less than the landing gear alert altitude value and the landing gear is not in a landing position; and
a means for outputting the generated landing gear alert.

13. The system of claim 12, wherein the means for outputting comprises a means for outputting an audible message.

14. The method of claim 12, wherein the means for outputting comprises a means for outputting a visual message.

15. The system of claim 12, wherein the aircraft is a rotary wing aircraft.

16. The system of claim 12, wherein the bug altitude setting is a radio bug altitude setting and the received altitude value is a radio altitude setting.

17. The system of claim 12, wherein the bug altitude setting is a barometric bug altitude setting and the received altitude value is a barometric altitude setting.

* * * * *